(12) United States Patent
Mitchell et al.

(10) Patent No.: US 7,903,901 B2
(45) Date of Patent: Mar. 8, 2011

(54) RECURSIVE FILTER SYSTEM FOR A VIDEO SIGNAL

(75) Inventors: Arthur Mitchell, Winchester (GB); Anthony Richard Huggett, Eastleigh (GB)

(73) Assignee: Ericsson AB, Stockholm (SE)

( * ) Notice: Subject to any disclaimer, the term of this patent is extended or adjusted under 35 U.S.C. 154(b) by 949 days.

(21) Appl. No.: 11/809,658

(22) Filed: Jun. 1, 2007

(65) Prior Publication Data

US 2008/0002903 A1 Jan. 3, 2008

(30) Foreign Application Priority Data

Jun. 2, 2006 (GB) .................................. 0610968.0

(51) Int. Cl.
*G06K 9/40* (2006.01)
(52) U.S. Cl. ...................................................... 382/265
(58) Field of Classification Search .................... 382/265
See application file for complete search history.

(56) References Cited

U.S. PATENT DOCUMENTS

| | | | | |
|---|---|---|---|---|
| 4,507,681 A * | 3/1985 | Verhoeven et al. | ........... | 378/98.7 |
| 4,590,582 A * | 5/1986 | Umemura | ...................... | 708/308 |
| 4,651,211 A * | 3/1987 | Weckenbrock et al. | ....... | 348/702 |
| 4,658,285 A * | 4/1987 | Lewis, Jr. | ........................ | 348/621 |
| 4,847,909 A * | 7/1989 | Shibata | ........................... | 382/107 |
| 4,860,104 A * | 8/1989 | Katsuyama | ................... | 348/620 |
| 5,018,179 A * | 5/1991 | Kaneko | ........................ | 378/98.12 |
| 5,296,937 A * | 3/1994 | Nakatani et al. | .............. | 358/448 |
| 5,903,680 A * | 5/1999 | De Haan et al. | .............. | 382/265 |
| 6,115,502 A * | 9/2000 | De Haan et al. | .............. | 382/260 |
| 6,259,489 B1 * | 7/2001 | Flannaghan et al. | .......... | 348/620 |
| 7,317,841 B2 * | 1/2008 | Yatsenko et al. | .............. | 382/260 |
| 2003/0053538 A1 * | 3/2003 | Katsavounidis et al. | | 375/240.01 |
| 2005/0117814 A1 * | 6/2005 | Riemens et al. | .............. | 382/275 |

FOREIGN PATENT DOCUMENTS

| | | |
|---|---|---|
| EP | 1 486 916 A | 12/2004 |
| GB | 1534486 A | 12/1978 |
| JP | 06311399 A | 11/1994 |
| WO | WO 03/073750 A1 | 9/2003 |

* cited by examiner

*Primary Examiner* — Brian Q Le
*Assistant Examiner* — Jayesh Patel

(57) ABSTRACT

A recursive filter system and method is provided. A weighted value of luminance and chrominance of a stored picture element is generated by summing weighted values of luminance and chrominance of a picture element and neighboring picture elements. A first proportional parameter for the stored picture element is generated with a sum of differences between the luminance and chrominance of the stored picture element and surrounding picture elements. A weighted picture element is generated from a proportion of the stored picture element and a complimentary proportion of the weighted value. Picture elements of the next image and a second proportional parameter are inputted. A filtered image is generated by combining a proportion of each input picture element of the next image with a complementary proportion of the weighted stored picture element of the first image. The filtered image is stored for corresponding combination with a succeeding image.

30 Claims, 3 Drawing Sheets

RECURSIVE FILTER SYSTEM FOR A VIDEO SIGNAL

FIELD OF THE INVENTION

This invention relates to a recursive filter system for a video signal and in particular to localised diffusion to enhance noise attenuation in recursive filtering.

BACKGROUND OF THE INVENTION

It is known, from, for example BBC Research Department Report "Video noise reduction" BBC RD 1984/7 N. E. Tanton et al., July 1984, that random noise in a sequence of television images, or some other kinds of electronically generated images, e.g. scanned film, can be reduced by applying a recursive temporal filter which operates on each picture element hereinafter abbreviated to 'pel'. It is beneficial to reduce noise levels prior to viewing images but it is also beneficial prior to processes that are sensitive to the presence of noise, especially compression systems such as those defined by, but not limited to, MPEG specifications. In practice, noise control is among several important and valuable techniques employed in pre-processing elements inherent in modern compression hardware and software realisations of these specifications.

For each pel indexed in an image by i, an output R(i) of a recursive filter is a sum of complementary proportions of a current image C(i) and a previous resultant output image S(i), such that proportions of C(i) and S(i) in the output R(i) are controlled by means of a fractional parameter K. If this notation is extended with a suffix 'f' to denote the frame, it is evident that the condition $S_f(i)=R_{f-1}(i)$ ensures a first order recursive temporal filter operation.

Hence, each pel in the result R(i) is expressed as:

$$R_f(i)=K \cdot C_f(i)+(1-K) \cdot S_{f-1}(i)$$

$$0 \leq K \leq 1$$

Equation 1: Recursive Noise Reduction Calculation

Where:

$C_f(i)$ is the current input image under operation; i is the index to individual pels of that image and f is an index to the sequence of frames or complete images, $S_f(i)$ is a stored array of pels equal to the result $R_{f-1}(i)$ of the filter operation on the previous image and i is the index to individual pels of that image.

R(i) is the resulting pel field, which, after the operation, is copied to S(i) before the operation is performed on the next image in the sequence and i is the index to individual pels of that image.

It is expected in the filter calculations that the index i of each of R(i), C(i) and S(i) is the same so that the pels are spatially co-located in each respective image. The index of pets in each image, i, may be defined in more than one-dimension; conventionally it is convenient to use two, corresponding to the commonly-used raster scanning of television images. Thus $R_f(i)$ becomes $R_f(x,y)$. The index f corresponds to the frame or temporal dimension.

K is the fractional parameter that controls a proportion of the current image C(x,y) to previous image S(x,y) used to make the current result R(x,y). In the prior art the parameter K does not change frequently with time, typically once per complete image, and in extreme cases may be fixed indefinitely at one value. It may also be operated under direct manual control. Experience shows that this is not satisfactory for some image material.

The value of K is used to control the degree of filtering (and hence noise attenuation) and that attenuation increases as K tends toward 0. At value K=0 there is no transmission of the incoming image C and the output is therefore "frozen" at S. This is an ideal setting to process still images where the absence of motion allows optimal filtering for noise reduction. In the presence of motion, however, the setting of K=0 is, in general, far from ideal. At K=1 there is no filtering at all and the output is identically equal to the input and no noise reduction is achieved.

This technique has some limitations. Objects in motion captured in successive images cause their respective pels to change position in the image and thus their index (x,y). Motion leads to changes in the position, i.e. lateral movement, or attitude, i.e. rotational movement, of recognisable objects in the image even when there is no camera movement. Changes in object position are also caused by camera movement such as panning or tilting, or both, and changes in object position and scale caused by zooming, i.e. changes in focal length of the camera lens. In all these cases the filter described above will therefore add together pels in successive images whose indices (x,y) no longer correspond to a same part of such moving objects and consequently motion will be confused with noise and the filter will reduce the value of the differences between successive images caused by motion as if it were noise. As a result, viewed images tend to blur for small amounts of movement and larger motion tends to create ghosts of any moving objects substantially compromising the image with artefacts. The essence of the problem is an inability to discriminate reliably between noise and motion, recognising that small amounts of motion can be difficult to distinguish from noise.

To reduce unwanted artefacts, the value of K can be defined on a per pel basis—i.e. K(x,y)—from information derived from the pel C(x,y) being processed and the surrounding pels. The value of K(x,y) can be derived from the temporal difference between co-located pels, however, this produces artefacts because this local difference is a function both of the sought after motion and the noise in the image. To discriminate between noise and motion requires the measurement and the subsequent exploitation of the differing statistical properties of the motion and the noise.

It is an object of the present invention at least to ameliorate the aforesaid shortcomings in the prior art.

It is a further object of the present invention to provide means whereby such discrimination between motion and noise may be improved.

It is a further object of this invention that means be described whereby the value of K may be varied pel-by-pel appropriately to reduce noise but also to suppress unwanted artefacts, so that K becomes K(x,y). When.

SUMMARY OF THE INVENTION

According to a first aspect of the present invention there is provided a recursive filter system for a video image comprising: storage means arranged to store a first image of stored picture elements S(x,y); weighting means arranged to generate weighted values W(x,y) of luminance and chrominance of a stored picture element S(x,y) by summing weighted values B(x,y)·S(x,y) of luminance and chrominance of the picture element and neighbouring picture elements; generating means arranged to generate a first proportional parameter A(x,y) for the stored picture element based on a modular sum of differences between luminance and chrominance of the stored picture element and of surrounding picture elements; first combinatorial means arranged to use the first proportional parameter A(x,y) to generate a weighted picture element M(x,y) from a proportion A(x,y) of the stored picture element S(x,y) and a complementary proportion 1−A(x,y) of the weighted value W(x,y); inputting means arranged to input picture elements of a next image and a second proportional parameter K; second combinatorial means arranged to use the second proportional parameter K to generate a filtered image R(x,y) by combining a proportion K of each input picture element C(x,y) of the next image with a complementary proportion 1−K of the weighted stored picture element M(x,y) of the first image and to store the filtered image in the storage means.

Conveniently, the weighting means is arranged to weight neighbouring picture elements using an array of weighting values.

Conveniently, the generating means comprises means for calculating a sum of absolute differences between chrominance and luminance of the picture element and surrounding picture elements.

Optionally, the generating means comprises means for calculating a sum of squares of the differences between chrominance and luminance of the picture element and surrounding picture elements.

Optionally, the generating means comprises means for calculating a positive square root of the sum of squares of the differences between chrominance and luminance of the picture element and surrounding picture elements.

Conveniently, the generating means comprises multiplication means for multiplying the modular sum of differences between luminance and chrominance of the stored picture element and of surrounding picture elements by the luminance and chrominance of the stored picture element respectively.

Conveniently, the generating means comprises scalar means for generating a normalised value of the proportional parameter A(x,y).

Advantageously, the recursive filter system further comprises programmable spatial low pass filter means and means for estimating spatial noise in the input image for controlling the low pass filter means, such that the input image is filtered proportionally to noise detected.

Advantageously, output from the means for estimating spatial noise is adjustable dependent upon a degree of detail detected in a region of an image being processed.

Conveniently, the recursive filter system further comprises a logic block controllable by a factor K indicative of a degree of motion in an area of an image being processed such that a proportional factor applied to the combinatorial means is a function of the noise and a degree of motion in a vicinity of a picture element being processed.

According to a second aspect of the invention, there is provided a method of enhancing noise attenuation in recursive filtering of a video image comprising the steps of: storing a first image to comprise stored picture elements S(x,y); generating a weighted value W(x,y) of luminance and chrominance of a stored picture element by summing weighted values B(x,y)·S(x,y) of luminance and chrominance of the picture element and neighbouring picture elements; generating a first proportional parameter A(x,y), for the stored picture element based on a sum of differences between the luminance and chrominance of the stored picture element and surrounding picture elements; using the first proportional parameter A(x,y) to generate a weighted picture element M(x,y) from a proportion A(x,y) of the stored picture element S(x,y) and a complementary proportion 1−A(x,y) of the weighted value W(x,y); inputting picture elements C(x,y) of a next image and a second proportional parameter K; using the second proportional parameter K to generate a filtered image by combining a proportion K of each input picture element C(x,y) of the next image with a complementary proportion 1−K of the weighted stored picture element M(x,y) of the first image; and storing the filtered image for corresponding combination with a succeeding image.

Conveniently, generating a weighted value comprises using an array of weighting values to weight neighbouring picture elements.

Conveniently, generating a weighted value comprises calculating a sum of absolute differences between chrominance and luminance of the picture element and surrounding picture elements.

Optionally, generating a weighted value comprises calculating a sum of squares of the differences between chrominance and luminance of the picture element and surrounding picture elements.

Optionally, generating a weighted value comprises calculating a positive square root of the sum of squares of the differences between chrominance and luminance of the picture element and surrounding picture elements Conveniently, generating a weighted value comprises multiplying the modular sum of differences between luminance and chrominance of the stored picture element and of surrounding picture elements by the luminance and chrominance of the stored picture element, respectively.

Conveniently, generating a weighted value comprises generating a normalised value of the proportional parameter A(x, y).

Advantageously, the method further comprises filtering the input image with programmable spatial low pass filter means using means for estimating spatial noise in the input image for controlling the low pass filter means, such that the input image is filtered proportionally to noise detected.

Conveniently, output from the means for estimating spatial noise is adjustable dependent upon a degree of detail detected in a region of an image being processed.

Advantageously, the method further comprises using a logic block controllable by a factor K indicative of a degree of motion in an area of an image being processed such that a proportional factor applied to the combinatorial means is a functional of the noise and a degree of motion in a vicinity of a picture element being processed.

According to a third aspect of the invention there is provided a computer program comprising code means for performing all the steps of the method described above when the program is run on one or more computers.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
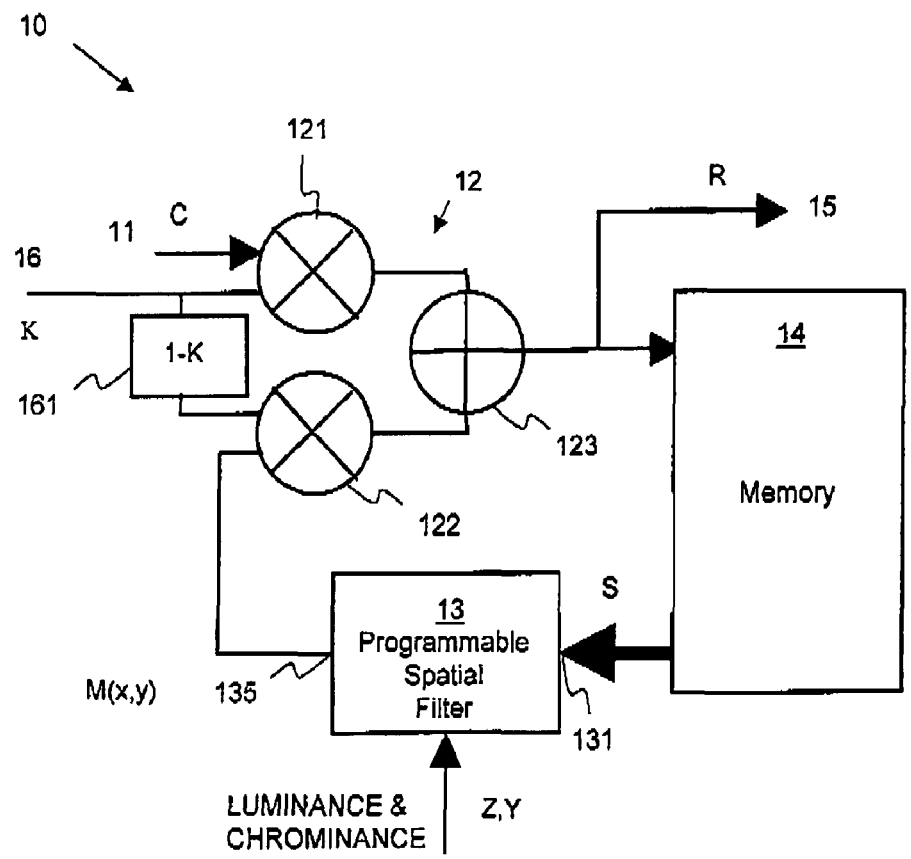
FIG. 1 is a schematic diagram of a recursive filter system according to the invention.

Throughout the description, identical reference numerals are used to identify like parts.

A simple application of the known prior art results in the pel field $R_f(x,y)$ from Equation 1 containing more noise than necessary and can, by virtue of erroneous adaptation to perceived motion, contain large errors resulting from large noise signals such as those encountered in images that have been transferred from physical media such as acetate film.

To assist a description of the invention, Equation 1 above is recast as follows:

$$R_f(x,y) = K \cdot C_f(x,y) + (1-K) \cdot M_{f-1}(x,y)$$

$$0 \leq K \leq 1$$

Equation 2: Modified Recursive Noise Reduction Calculation

Where $M_{f-1}(x,y)$ is the value of $R_f(x,y)$ calculated for the previous frame and the index into the pel field is expressed as two-dimensional in order to clarify the derivation of a weighted average $W_f(x,y)$ and $M_f(x,y)$ given by:

$$M_f(x,y) = A \cdot S_f(x,y) + (1-A) \cdot W_f(x,y)$$

$$0 \leq A \leq 1$$

Equation 3: Calculation of the Historical Value M

Instead of using only the single spatially corresponding pel $S_f(x,y)$ from the stored image, as shown in Equation 1, a weighted average $W_f(x,y)$ of the surrounding pels is formed and a value for $M_f(x,y)$ generated linearly from these two values based on the localised activity between the current image and stored results. This linear relation is controlled through a parameter A where A is derived from local activity of the image; the parameter A can also be used as a means of accounting for psychovisual factors such as masking which can assist in making the noise filtering process optimally effective. One means of applying such a psychovisual mask, in this case the use of local contrast measures, is described in EP 0986264 and U.S. Pat. No. 6,701,019.

The principle of using a local weighted average instead of single pel values can be applied both to the stored picture pels $S_f(x,y)$ and to the input picture pels $C_f(x,y)$. The latter element of this invention is described further below. The value of the parameter $A(x,y)$, which is calculated independently for each pel, is illustrated in Equations 4a-4c and is calculated as follows, where the first line in each of Equations 4a and 4b forms a mean over the array of pels around the pel of current interest, $S_f(x,y)$, in the stored picture. It will be understood by those skilled in the art that the luminance and chrominance will be treated separately in similar fashion and that a balance between the contribution that each makes to an overall effect is controlled through parameters $Z(x,y)$ and $Y(x,y)$ each of which may be indexed and varied pel by pel.

$$A_{luma}(x,y) = $$

$$\text{Mean\_Luma} = \frac{\sum_{n=-2}^{2} \sum_{m=-1}^{1} S_{luma}(x+m, y+n)}{15}$$

$$Z(x,y) \cdot \left[ \sum_{n=-2}^{2} \sum_{m=-1}^{1} \text{ABS}\{\text{Mean\_Luma} - S_{luma}(x+m, y+n)\} \right] / 15$$

Equation 4a: Derivation of the Luminance Multiplier Value $A_{luma}$ as a Sum of Absolute Differences, SAD $$A_{chroma}(x,y) = $$

$$\text{Mean\_Chroma} = \frac{\sum_{n=-2}^{2} \sum_{m=-1}^{1} S_{chroma}(x+m, y+n)}{15}$$

$$Y(x,y) \cdot \left[ \sum_{n=-2}^{2} \sum_{m=-1}^{1} \text{ABS}\{\text{Mean\_Chroma} - S_{chroma}(x+m, y+n)\} \right] / 15$$

Equation 4b: Derivation of the Chrominance Multiplier Value $A_{chroma}$ as a Sum of Absolute Differences, SAD $$A_{Total}(x,y) = A_{luma}(x,y) + A_{chroma}(x,y)$$

Equation 4c: Derivation of the Multiplier Value $A_{Total}$ as a Sum of $A_{luma}$ and $A_{chroma}$ In Equation 4c the value of $A_{Total}(x,y)$ is calculated by adding $A_{luma}$ to $A_{chroma}$; other means of combination may be used such as averaging or largest value or sum of squares, as appropriate.

It will be understood by one skilled in the art that $A_{chroma}$ is a composite of the red and blue difference values and should be calculated from the spatially corresponding information in the video stream.

In Equations 4a-4c, the values of $A_{luma}(x,y)$, $A_{chroma}(x,y)$ and $A_{Total}(x,y)$, which are always positive, are calculated in this example from the absolute value of the differences between the mean level near the index point $(x,y)$ and the pel values around that point, $S_f(x,y)$. Other positive value expressions may also be used such as the sum of the squares of the differences, as illustrated in Equation 5 where the luminance signal only is given, it being understood that the chrominance and total values of A will be calculated as in Equations 4b and 4c respectively:

$$A_{luma}(x,y) = Z(x,y) \cdot \left[ \sum_{n=-2}^{2} \sum_{m=-1}^{1} \{\text{Mean\_Luma} - S_{luma}(x+m, y+n)\}^2 \right] / 15$$

Equation 5: Calculation of the Luminance Mean of the Sum of the Squares of Pel Differences or the positive root of the mean of these same squares as illustrated in Equation 6 where once again the luminance only is given it being understood that the chrominance will be calculated similarly and the total value of A as in Equation 4c:

$$A_{luma}(x, y) = Z(x, y) \cdot \sqrt{\left[\sum_{n=-2}^{2}\sum_{m=-1}^{1}\{Mean\_Luma - S_{luma}(x+m, y+n)\}^2\right]/15}$$

Equation 6: Calculation of the Square Root of the Mean of the Sum of the Squares of Pel Differences The calculation of the weighted value of $S_f(x,y)$ is performed according to Equation 7 and Table 1, where only the luminance calculation is given, it being understood that the chrominance $A_C(x,y)$ value of will be calculated using a similar expression and table and the value of $A_{Total}(x,y)$ will be calculated according to a similar expression to that in Equation 4c or equivalent:

$$W_{luma}(x, y) = \sum_{n=-2}^{2}\sum_{m=-1}^{1} B_{luma}(m, n) S_{luma}(x+m, y+n)$$

Equation 7: Calculation of the Weighted Average Value W

Where a set of exemplary values for $B_{luma}(m,n)$ are defined in Table 1:

TABLE 1

Exemplary weighting values for array $B_{luma}(m, n)$

|  | m = −1 | m = 0 | m = 1 |
|---|---|---|---|
| n = −2 | 0.0625 | 0.125 | 0.0625 |
| n = −1 | 0.125 | 0.5 | 0.125 |
| n = 0 | 0.5 | 1 | 0.5 |
| n = 1 | 0.125 | 0.5 | 0.125 |
| n = 2 | 0.0625 | 0.125 | 0.0625 |

FIG. 1 shows an overview of an implementation of a recursive filter system 10 according to the invention, in which separate luminance and chrominance processing paths are assumed to be combined.

Referring to FIG. 1, in the recursive filter system 10 according to the invention, a first multiplier 121 has a first input 11 for a source image C and a second input 16 for the fractional parameter K. An output of the first multiplier 121 is connected to a first input of an adder 123. The fractional parameter K is also input to a block 161 to calculate the complementary proportion 1−K and the output of the block 161 is connected to a first input of a second multiplier 122 in parallel with the first multiplier 121. An output of the second multiplier 122 is connected to a second input of the adder 123. An output of the adder 123 is connected to an output port 15 of the recursive filter system and to a write port of a memory 14. A read port of the memory 14 is connected to an input 131 of a programmable spatial filter 13, also having an input for luminance and chrominance parameters. An output 135 of the programmable spatial filter, 13, is connected to a second input of the second multiplier 122.

In use, a current image C enters the system at the first input 11 of the first multiplier 121. The arrangement 12 of the first and second multipliers 121, 122 and the adder 123 performs the operation of Equation 2, and fades R between the current image C and a processed pel field S are written to memory 14 controlled by a value of parameter K entered at the second input 16 of the first multiplier 121. A processed image is output from the recursive filter system 10 at output 15. The programmable spatial filter 13 represents an enhancement provided by the invention to a conventional recursive filter system and inputs an array of pels local to a pel being processed, derives an activity and weighted average and processes them by the luminance Z and chrominance Y, where separate luminance and chrominance processing paths are shown combined.

Figure 2:
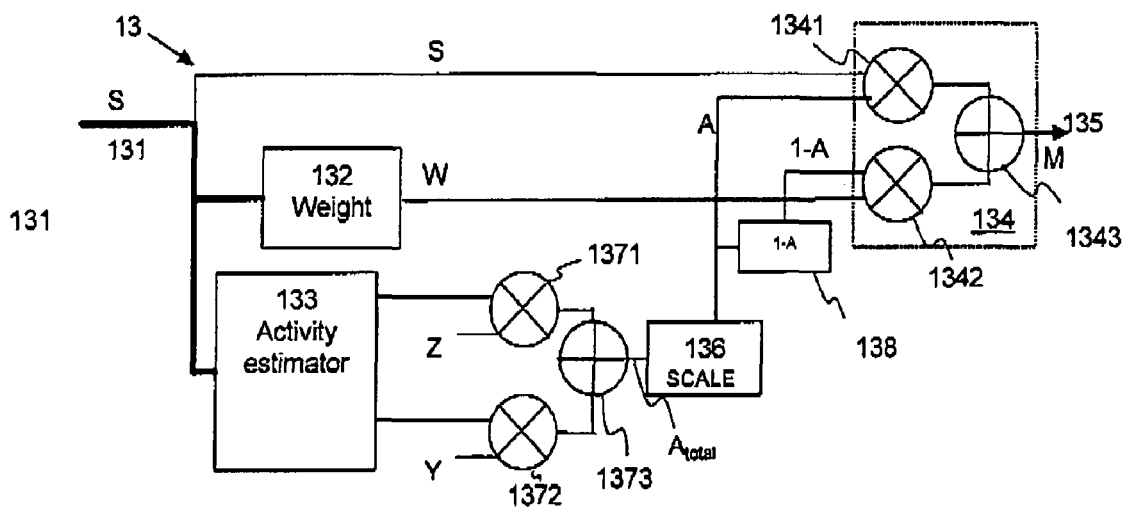
FIG. 2 is a schematic diagram of the programmable spatial filter of FIG. 1.

Further detail of the programmable spatial filter 13 of the invention is illustrated by FIG. 2 where the operation of the various weighting functions and parameters are more explicitly illustrated.

Referring to FIG. 2, the input 131 of the programmable spatial filter 13 is connected in parallel to a first input of a third multiplier 1341 forming an element of a multiplier and adder arrangement 134, to a block 132 for calculating a weighting function and to an activity estimator block 133.

First and second outputs from the activity estimator 133 feed first inputs of fifth and sixth multipliers, 1371 and 1372 in parallel. Second inputs of the fifth and sixth multipliers, 1371 and 1372 have inputs for Z & Y parameters respectively. Outputs of the fifth and sixth multipliers, 1371 and 1372 are connected to first and second inputs of a third adder 1373, respectively. An output of adder 1373 is connected to an input of a scalar block, 136.

An output of the scalar block 136 is connected to a second input of the third multiplier 1341. An output of the scalar block 136 is also input to a 1−A block 133 for calculating a complement of A and an output of the 1−A block 138 is connected to a first input of a fourth multiplier 1342 forming an element of the multiplier and adder arrangement 134. An output of the weighting block 132 for calculating a weighting function is connected to a second input of the fourth multiplier 1342. Outputs of the third and fourth multipliers 1341, 1342 are connected to respective first and second inputs of a second adder 1343 forming an element of the arrangement 134. An output of the second adder forms the output 135 of the programmable spatial filter 13.

Figure 5:
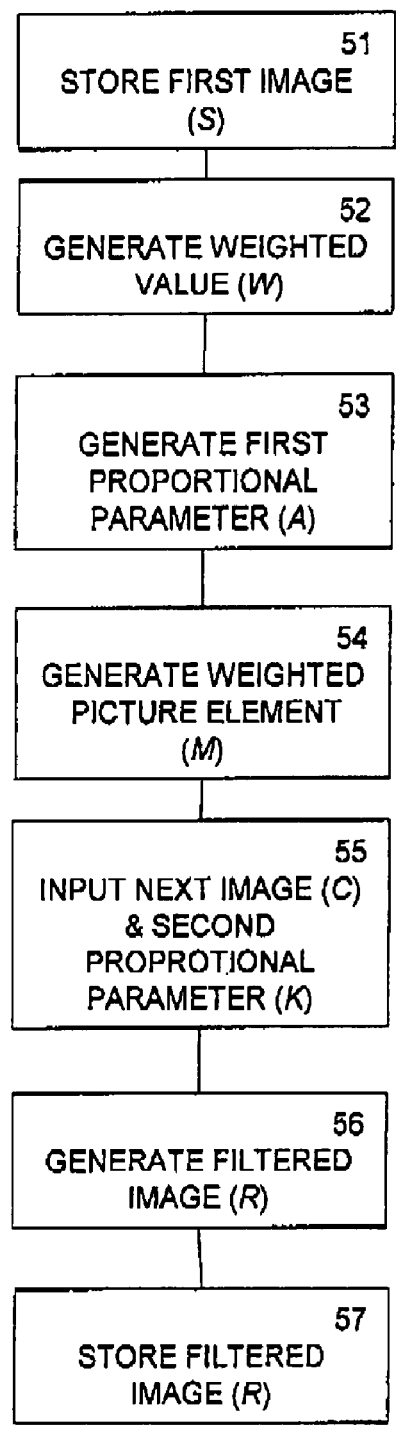
FIG. 5 is a flowchart of a method according to the invention.

Referring to FIGS. 1, 2 and 5, in use an image S is stored, step 51, in the memory 14. Picture elements S(x,y) are read from the memory 14 and weighted values W(x,y) are generated, step 52, for a retrieved picture element S(x,y) by the weighting block 132 using Equation 7 and an array of weighting values $B_{luma}(m,n)$ as exemplified by Table 1. A first proportional parameter $A_{total}(x,y)$ is generated, step 53, for the luminance and chrominance of the picture element based on a sum of differences as exemplified in Equations 4a and 4b, 5 or 6 together with Equation 4c, i.e. generated by activity estimator 133 and fifth and sixth multipliers 1371, 1372 which process the estimated luminance and chrominance activity with Z & Y and add the resultant values with third adder 1373, implementing Equation 4c. A scaler value of the first proportional parameter A(x,y) is obtained by the scaler 136. Using the first proportional parameter $A_{total}(x,y)$, a weighted picture element M(x,y) is generated, step 54, from a proportion of the stored picture element S(x,y) and a complementary proportion of the weighted value W(x,y) by the fader arrangement 134. Picture elements C(x,y) of a next image are input step 55, at input 11 and a second proportional parameter K input at the second input 16. Using the second proportional parameter K a filtered image R(x,y) is generated, step 56, from a proportion of the input picture element C(x,y)

and a complementary proportion of the weighted picture element M(x,y) by the fader arrangement 12. The filtered picture element R(x,y) is output from the output 15 and stored, step 57, in the memory 14 for processing a succeeding image.

Thus, in summary, an array of pels local to a pel being processed enter the programmable spatial filter 13 at input 131. Weighting block 132 derives a weighting function W(x, y), generated as illustrated in Equation 7; Activity estimator 133 and scaler 136 derive $A_{total}(x,y)$ using Equation 4, the multiplication by luminance and chrominance parameters Z and Y being separated out for clarity and where separate luminance and chrominance processing paths are assumed to be combined. Block 136 implements a required scaling operation on A to render its value in a range 0 to 1 and thence to enable the programmable spatial filter to effect a fade between the spatially co-located value S(x,y) and the weighted average W(x,y). The fader arrangement 134 derives the interim result M(x,y) from Equation 3.

Example of Measured Performance Results

The invention was applied to a recursive filter system and the processed image encoded in real time with an MPEG2 high definition encoder. Table 2 shows a summary of the resultant gains in luminance peak signal to noise ratio, PSNR. Although numerically small, these gains proved to be significant in terms of perceived picture quality.

TABLE 2

Resultant systemic gains in PSNR

| Sequence name | PSNR Without Enhancement | PSNR With Enhancement | Gain |
| --- | --- | --- | --- |
| Ray Charles Montreux | 36.1 dB | 36.47 dB | 0.37 dB |
| Moscow | 38.26 dB | 38.91 dB | 0.65 dB |
| 101 Dalmatians wedding | 39.8 dB | 40.6 dB | 0.8 dB |
| Woman keyed over flowers | 35.15 dB | 36.11 dB | 0.96 dB |

Further Enhancement to the System

Figure 3:
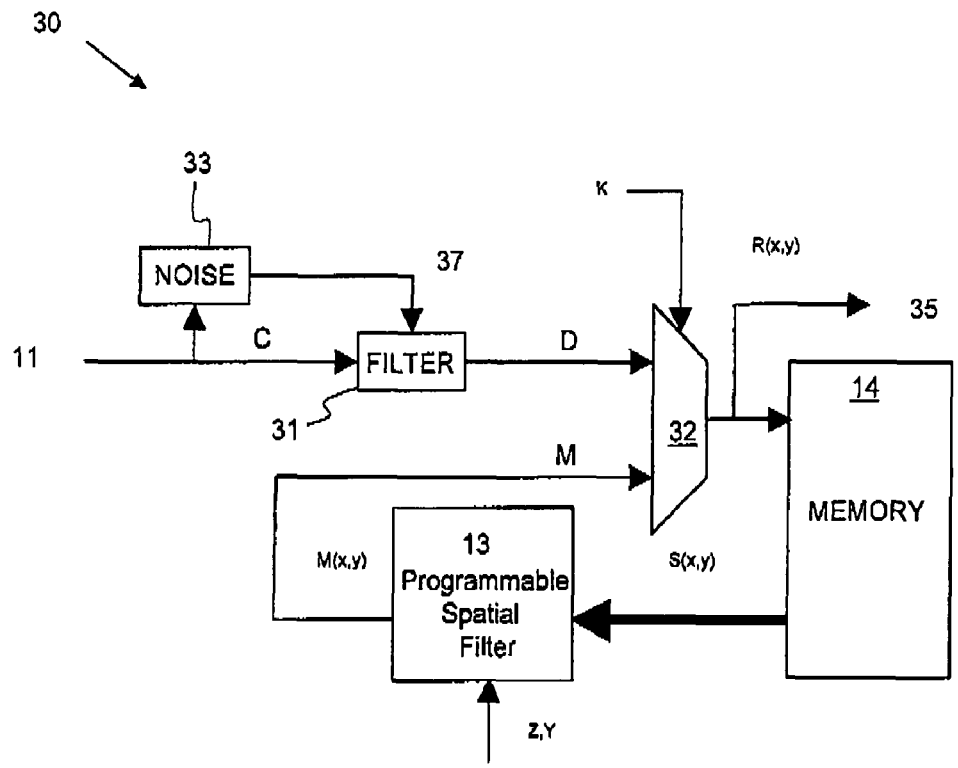
FIG. 3 is a schematic diagram of the recursive filter system of FIG. 1 combined with spatial filtering of both input and stored pels.

A further improvement to the results from the system can be gained if the concept of spatial filtering applied to the stored picture S(x,y), described above, is also applied to a current input image C(x,y) and then both processes combined to make a multistage mixer stage as illustrated in FIG. 3. It is assumed in all the following description that separate chrominance and luminance calculations are made as for the description above. Equation 2 is repeated here for convenience:

$$R_f(x,y) = K \cdot C_f(x,y) + (1-K) \cdot M_{f-1}(x,y)$$

$$0 \leq K \leq 1$$

Equation 8: Modified Store Output Recursive Noise Reduction Calculation

In the embodiment described here and illustrated in Equation 8 the pel stream represented by C(x,y) is modified in a similar way to that used above to produce the modified stored pet stream M(x,y).

$$D_f(x,y) = V \cdot C_f(x,y) + (1-V) \cdot N_f(x,y)$$

Equation 9: Modified Input Recursive Noise Reduction Calculation where $D_f(x,y)$ is a weighted and filtered form of $C_f(x,y)$ using similar techniques to those described above. V is a control value and N is a spatially filtered version of C.

Figure 4:
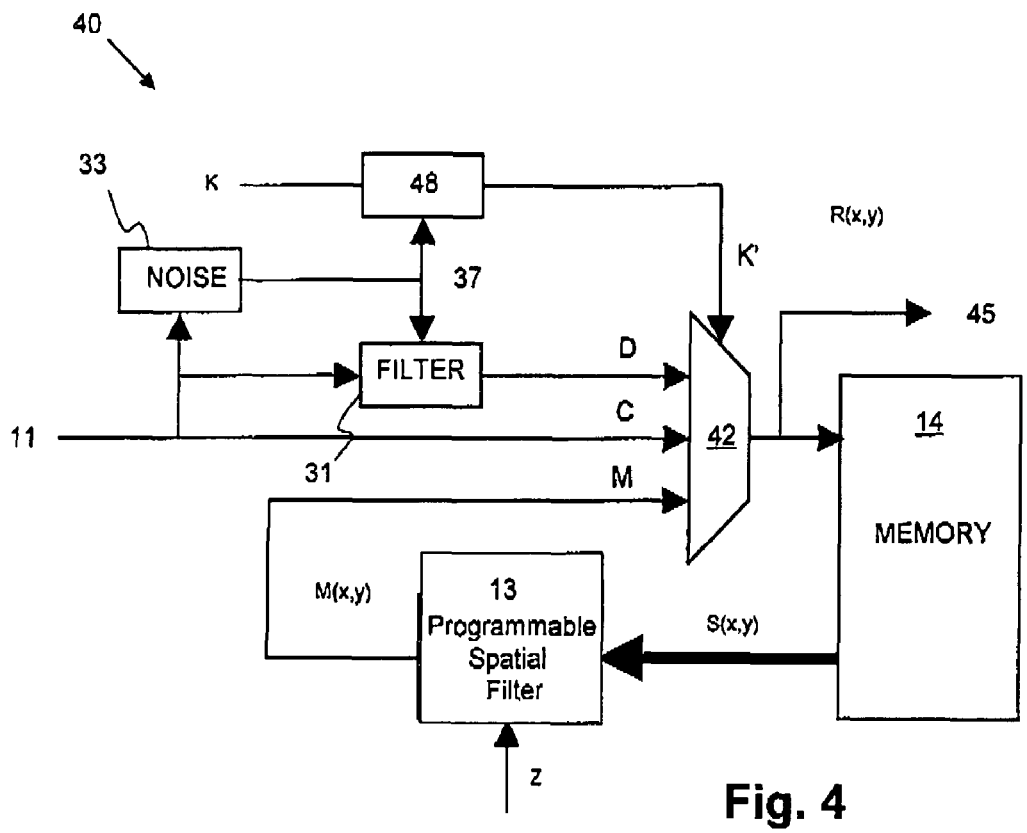
FIG. 4 is a schematic diagram of the recursive filter system of FIG. 1 combined with complex mapping between noise and motion estimates.

In FIGS. 3 & 4 the arrangement 12 of two multipliers and an adder have been represented by a single rhombus indicating a fader, for additional clarity of the illustration.

Referring to FIG. 3, in this embodiment of a recursive filter system according to the invention, a image source input 11 is connected to an input of a programmable spatial low pass filter 31. The image source input 11 is also connected to an input of a block 33 for estimating spatial noise in a current image. An output of block 33 is connected to a control input 37 of the programmable spatial low pass filter 31. An output of the programmable spatial low pass filter 31 is connected to an input of a fader 32, which also has a control input for the fractional parameter K. An output of the fader 32 is connected to an output 35 of the recursive filter system 30 and also to a write input of a memory 14. A read output of the memory 14 is connected to an input of a programmable spatial filter 13 which also has an input for luminance and chrominance parameters Z & Y. An output of the programmable spatial filter 13 is connected to a second input of the fader 32.

A variable degree of filtering by the programmable spatial low pass filter 31 is varied by a numeric value input at the control input 37. Block 33 provides an estimate of the spatial noise within a current image being processed, using, for example, a noise analyser as disclosed in the Applicant's application filed on the same date as this application under Applicant's reference number P113931GB. This value at input 37 is used to control the low pass spatial filter 31.

Preferably, the value at input 37 varies on a pel by pel basis to filter only where noise is detected. Further, block 33 can lower its resultant output value if the input image is determined to have a high degree of detail in a region being processed.

This embodiment combines the spatial filters but does not change the way that the final output value is selected at output 35.

While spatial filtering can help in noise reduction it also produces softening of the picture, which is most noticeable with modern high definition video.

An optimal result can be achieved by applying spatial filtering disproportionately to objects in motion, since psycho-visual aspects of objects in motion do not allow the eye to pick up blurring so readily.

To this end FIG. 4 illustrates a combined system 40 to derive the output R(x,y) at output 45 from a combination of the input C, a filtered version D of the input and a filtered version M of the stored output.

Referring to FIG. 4, in this further embodiment of a recursive filter system 40 according to the invention, as in the embodiment of FIG. 3, an image source input 11 is connected to an input of a programmable spatial low pass filter 31. The image source input 11 is also connected to an input of a block 33 for estimating spatial noise in a current image. An output of block 33 is connected to a control input 37 of the programmable spatial low pass filter 31. An output of the programmable spatial low pass filter 31 is connected to an input of a fader 42. The output of the block 33 for estimating spatial noise is also input to a block 48 which has a further input of the recursive filter system for the fractional parameter K. An output of the block 48 forms a control input to the fader 42. The fader 42 has an additional input from the image source input 11. An output of the fader 42 is connected to an output 45 of the recursive filter system 40 and also to a write input of a memory 14. A read output of the memory 14 is connected to an input of a recursive filter 13 which also has a luminance and chrominance input. An output of the recursive filter 13 is connected to a third input of the fader 32.

A balance is governed by logic in block 48 which is controlled by means of the fractional parameter 'K', a derivation of motion in this area, and the measured spatial noise in the current picture 37. A strategy used is that in areas in motion and suffering noise there is advantage in tending toward using softened local picture information. Equation 9 is an example of one manner of operation of control block 48.

$$K^l(i) = \frac{1}{\left[\frac{(1-N(i))}{10} + \frac{(1-K(i))}{10}\right]}$$

$$0 \leq K \leq 1$$

$$0 \leq N \leq 1$$

Equation 10: Exemplary Motion-Spatial Noise Calculation

Where N is the estimated noise and K' is the derived motion estimation.

SUMMARY

These embodiments of the invention reduce a noise component in a value taken from a stored pel array and an equivalent input array to enhance noise attenuation and, where large difference information has formed in the store, the embodiments increase a rate of convergence to remove any ghosting from the processed image.

While this technique in the feedback path in the recursive algorithm could cause localised softening to the image, any softening is confined to areas with noise, so producing more visually acceptable images Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

We claim:

1. A recursive filter system for a video image comprising:
   a. memory storage means arranged to store a first image of stored picture elements S(x,y);
   b. weighting means arranged to generate weighted values W(x,y) of luminance and chrominance of a stored picture element S(x,y) by summing weighted values B(x,y)·S(x,y) of luminance and chrominance of the picture element and neighbouring picture elements;
   c. generating means arranged to generate a first proportional parameter A(x,y) for the stored picture element based on a modular sum of differences between luminance and chrominance of the stored picture element and of surrounding picture elements;
   d. first combinatorial means arranged to use the first proportional parameter A(x,y) to generate a weighted picture element M(x,y) from a proportion of the stored picture element S(x,y) and a complementary proportion 1−A(x,y) of the weighted value W(x,y);
   e. inputting means arranged to input picture elements of a next image and a second proportional parameter K;
   f. second combinatorial means arranged to use the second proportional parameter K to generate a filtered image R(x,y) by combining a proportion of each input picture element C(x,y) of the next image with a complementary proportion 1−K of the weighted stored picture element M(x,y) of the first image and to store the filtered image in the storage means.

2. The recursive filter system as claimed in claim 1, wherein the weighting means is arranged to weight neighbouring picture elements using an array of weighting values.

3. The recursive filter system as claimed in claim 1, wherein the generating means comprises means for calculating a sum of absolute differences between chrominance and luminance of the picture element and surrounding picture elements.

4. The recursive filter system as claimed in claim 1, wherein the generating means comprises means for calculating a sum of squares of the differences between chrominance and luminance of the picture element and surrounding picture elements.

5. The recursive filter system as claimed in claim 4, wherein the generating means comprises means for calculating a positive square root of the sum of squares of the differences between chrominance and luminance of the picture element and surrounding picture elements.

6. The recursive filter system as claimed in claim 1, wherein the generating means comprises multiplication means for multiplying the modular sum of differences between luminance and chrominance of the stored picture element and of surrounding picture elements by the luminance and chrominance of the stored picture element respectively.

7. The recursive filter system as claimed in claim 1, wherein the generating means comprises scalar means for generating a normalised value of the proportional parameter A(x,y).

8. The recursive filter system as claimed in claim 1, further comprising programmable spatial low pass filter means and means for estimating spatial noise in the input image for controlling the low pass filter means, such that the input image is filtered proportionally to noise detected.

9. The recursive filter system as claimed in claim 8, wherein output from the means for estimating spatial noise is adjustable dependent upon a degree of detail detected in a region of an image being processed.

10. The recursive filter system as claimed in claim 8, further comprising a logic block controllable by a factor indicative of a degree of motion in an area of an image being processed such that a proportional factor applied to the combinatorial means is a function of the noise and a degree of motion in a vicinity of a picture element being processed.

11. A method of enhancing noise attenuation in recursive filtering of a video image comprising the steps of:
   a. storing a first image to comprise stored picture elements S(x,y) in a memory;
   b. generating a weighted value W(x,y) of luminance and chrominance of a stored picture element by summing weighted values B(x,y)·S(x,y) of luminance and chrominance of the picture element and neighbouring picture elements;

c. generating a first proportional parameter A(x,y) for the stored picture element based on a modular sum of differences between the luminance and chrominance of the stored picture element and surrounding picture elements;

d. using the first proportional parameter A(x,y) to generate a weighted picture element M(x,y) from a proportion of the stored picture element S(x,y) and a complementary proportion 1−A(x,y) of the weighted value W(x,y);

e. inputting picture elements C(x,y) of a next image and a second proportional parameter K;

f. using the second proportional parameter K to generate a filtered image by combining a proportion of each input picture element C(x,y) of the next image with a complementary proportion 1−K of the weighted stored picture element M(x,y) of the first image; and g. storing the filtered image for corresponding combination with a succeeding image.

12. The method as claimed in claim 11, wherein generating a weighted value comprises using an array of weighting values to weight neighbouring picture elements.

13. The method as claimed in claim 11, wherein generating a weighted value comprises calculating a sum of absolute differences between chrominance and luminance of the picture element and surrounding picture elements.

14. The method as claimed in claim 11, wherein generating a weighted value comprises calculating a sum of squares of the differences between chrominance and luminance of the picture element and surrounding picture elements.

15. The method as claimed in claim 14, wherein generating a weighted value comprises calculating a positive square root of the sum of squares of the differences between chrominance and luminance of the picture element and surrounding picture elements.

16. The method as claimed in claim 11, wherein generating a weighted value comprises multiplying the modular sum of differences between luminance and chrominance of the stored picture element and of surrounding picture elements by the luminance and chrominance of the stored picture element, respectively.

17. The method as claimed in claim 11, wherein generating a weighted value comprises generating a normalised value of the proportional parameter A(x,y).

18. The method as claimed in claim 11, further comprising filtering the input image with programmable spatial low pass filter means using means for estimating spatial noise in the input image for controlling the low pass filter means, such that the input image is filtered proportionally to noise detected.

19. The method as claimed in claim 18, wherein output from the means for estimating spatial noise is adjustable dependent upon a degree of detail detected in a region of an image being processed.

20. The method as claimed in claim 18, further comprising using a logic block controllable by a factor indicative of a degree of motion in an area of an image being processed such that a proportional factor applied to the combinatorial means is a functional of the noise and a degree of motion in a vicinity of a picture element being processed.

21. A computer executable software code stored on a non-transitory computer readable medium, the code being for enhancing noise attenuation in recursive filtering of a video image comprising the steps of:

a. storing a first image to comprise stored picture elements S(x,y) in a memory;

b. generating a weighted value W(x,y) of luminance and chrominance of a stored picture element by summing weighted values B(x,y)·S(x,y) of luminance and chrominance of the picture element and neighbouring picture elements;

c. generating a first proportional parameter A(x,y) for the stored picture element based on a modular sum of differences between the luminance and chrominance of the stored picture element and surrounding picture elements;

d. using the first proportional parameter A(x,y) to generate a weighted picture element M(x,y) from a proportion of the stored picture element S(x,y) and a complementary proportion 1−A(x,y) of the weighted value W(x,y);

e. inputting picture elements C(x,y) of a next image and a second proportional parameter K;

f. using the second proportional parameter K to generate a filtered image by combining a proportion of each input picture element C(x,y) of the next image with a complementary proportion 1−K of the weighted stored picture element M(x,y) of the first image; and g. storing the filtered image for corresponding combination with a succeeding image.

22. The computer executable software code as claimed in claim 21, wherein generating a weighted value comprises using an array of weighting values to weight neighbouring picture elements.

23. The computer executable software code as claimed in claim 21, wherein generating a weighted value comprises calculating a sum of absolute differences between chrominance and luminance of the picture element and surrounding picture elements.

24. The computer executable software code as claimed in claim 21, wherein generating a weighted value comprises calculating a sum of squares of the differences between chrominance and luminance of the picture element and surrounding picture elements.

25. The computer executable software code as claimed in claim 24, wherein generating a weighted value comprises calculating a positive square root of the sum of squares of the differences between chrominance and luminance of the picture element and surrounding picture elements.

26. The computer executable software code as claimed in claim 21, wherein generating a weighted value comprises multiplying the modular sum of differences between luminance and chrominance of the stored picture element and of surrounding picture elements by the luminance and chrominance of the stored picture element respectively.

27. The computer executable software code as claimed in claim 21, wherein generating a weighted value comprises generating a normalised value of the proportional parameter A(x,y).

28. The computer executable software code as claimed in claim 21, further comprising filtering the input image with programmable spatial low pass filter means using means for estimating spatial noise in the input image for controlling the low pass filter means, such that the input image is filtered proportionally to noise detected.

29. The computer executable software code as claimed in claim 28, wherein output from the means for estimating spatial noise is adjustable dependent upon a degree of detail detected in a region of an image being processed.

30. The computer executable software code as claimed in claim 28, further comprising using a logic block controllable by a factor indicative of a degree of motion in an area of an image being processed such that a proportional factor applied to the combinatorial means is a functional of the noise and a degree of motion in a vicinity of a picture element being processed.

* * * * *

UNITED STATES PATENT AND TRADEMARK OFFICE
CERTIFICATE OF CORRECTION

| | |
|---|---|
| PATENT NO. | : 7,903,901 B2 |
| APPLICATION NO. | : 11/809658 |
| DATED | : March 8, 2011 |
| INVENTOR(S) | : Mitchell et al. |

It is certified that error appears in the above-identified patent and that said Letters Patent is hereby corrected as shown below:

In Column 1, Line 47, delete "images," and insert -- images. --, therefor.

In Column 1, Line 58, delete "pets" and insert -- pels --, therefor.

In Column 8, Line 33, delete "133" and insert -- 138 --, therefor.

In Column 9, Line 58, delete "pet" and insert -- pel --, therefor.

In Column 11, Line 11, delete "$K^1(i)$" and insert -- $K'(i)$ --, therefor.

Signed and Sealed this
Twenty-fourth Day of May, 2011

David J. Kappos
*Director of the United States Patent and Trademark Office*